United States Patent
Donaldson

(10) Patent No.: US 9,690,172 B2
(45) Date of Patent: *Jun. 27, 2017

(54) OMNIDIRECTIONAL USER CONFIGURABLE MULTI-CAMERA HOUSING

(71) Applicant: ARECONT VISION, LLC, Glendale, CA (US)

(72) Inventor: Brad J. Donaldson, Valencia, CA (US)

(73) Assignee: ARECONT VISION, LLC, Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/226,816

(22) Filed: Aug. 2, 2016

(65) Prior Publication Data

US 2016/0357092 A1  Dec. 8, 2016

Related U.S. Application Data

(63) Continuation of application No. 14/682,974, filed on Apr. 9, 2015, now Pat. No. 9,438,782.

(Continued)

(51) Int. Cl.
*G03B 17/00* (2006.01)
*H04N 5/225* (2006.01)
(Continued)

(52) U.S. Cl.
CPC ............ *G03B 17/561* (2013.01); *G03B 11/00* (2013.01); *G03B 17/02* (2013.01); *G03B 17/08* (2013.01);
(Continued)

(58) Field of Classification Search
CPC combination set(s) only.
See application file for complete search history.

(56) References Cited

U.S. PATENT DOCUMENTS 4,080,629 A † 3/1978 Hammond
4,341,452 A * 7/1982 Korling ............... F16M 11/105
248/179.1
(Continued)

FOREIGN PATENT DOCUMENTS

EP  2077538 A1 † 7/2009
WO 2004095386 A1 † 11/2004

OTHER PUBLICATIONS

Axis Q60 Series Installation Guide, 26 pages, marked on last page with copyright notice "copyright Axis Communications AB, 2012" and with printing date "Printed: Oct. 2012." Accessed and downloaded in PDF format on Jan. 25, 2017 from www.archive.org website ("Wayback Machine") for website captures of the Axis Communications website, www.axis.com, dated Dec. 15, 2012.†

(Continued)

*Primary Examiner* — Minh Phan
(74) *Attorney, Agent, or Firm* — Lewis Roca Rothgerber Christie LLP

(57) ABSTRACT

An omnidirectional user configurable multi-camera housing includes a top plate including one or more electronic circuit boards thereon; a track plate secured to the top plate by a plurality of first fasteners, wherein the track plate is rotationally movable with respect to the top plate via a respective curve-shaped opening that accommodates movement of a respective first fastener within the respective curve-shaped opening; a plurality of camera assemblies secured to the track plate by a plurality of magnetic devices, each of the camera assemblies including a camera and a bracket, movably installed on the track, wherein each of the camera is rotatable on a respective bracket in a plane perpendicular to the track plate, and wherein each of the bracket are rotatable in a plane including the track plate; and a transparent cover (Continued)

for covering the plurality of camera assemblies installed on the track plate.

9 Claims, 8 Drawing Sheets

Related U.S. Application Data

(60) Provisional application No. 62/009,760, filed on Jun. 9, 2014.

(51) Int. Cl.
| | | |
|---|---|---|
| *G03B 17/56* | (2006.01) | |
| *H04N 5/247* | (2006.01) | |
| *G03B 17/02* | (2006.01) | |
| *G03B 19/02* | (2006.01) | |
| *G08B 13/196* | (2006.01) | |
| *G03B 11/00* | (2006.01) | |
| *G03B 17/08* | (2006.01) | |
| *G03B 17/55* | (2006.01) | |
| *G03B 37/04* | (2006.01) | |

(52) U.S. Cl.
CPC ........... *G03B 17/55* (2013.01); *G03B 19/023* (2013.01); *G08B 13/19619* (2013.01); *H04N 5/2252* (2013.01); *H04N 5/2258* (2013.01); *H04N 5/247* (2013.01); *G03B 37/04* (2013.01)

(56) References Cited

U.S. PATENT DOCUMENTS

| | | | | |
|---|---|---|---|---|
| 4,945,367 A | * | 7/1990 | Blackshear | G08B 13/19619 348/143 |
| 6,064,430 A | † | 5/2000 | Lefkowitz | |
| 6,354,749 B1 | † | 3/2002 | Pfaffenberger | |
| 2007/0053681 A1 | * | 3/2007 | Arbuckle | F16M 11/10 396/427 |
| 2007/0257995 A1 | * | 11/2007 | Horowitz | G01J 1/4228 348/234 |
| 2010/0033577 A1 | * | 2/2010 | Doak | H04N 7/181 348/159 |
| 2012/0092504 A1 | † | 4/2012 | Murphy | |
| 2012/0154521 A1 | * | 6/2012 | Townsend | H04N 5/247 348/36 |
| 2012/0242785 A1 | | 9/2012 | Sasagawa et al. | |
| 2012/0242788 A1 | * | 9/2012 | Chuang | G08B 13/19602 348/36 |
| 2015/0177596 A1 | † | 6/2015 | Bergsten | |

OTHER PUBLICATIONS

Axis P33-VE Network Camera Series—Pendant Kit Installation Guide, 34 pages, copyright notice of "(c) Axis Communications AB, 2009-2014" and a notation of "Printed: Feb. 2014" on the last page of the document. Accessed and downloaded in PDF format on Jan. 25, 2017 from www.archive.org website ("Wayback Machine") for website captures of the Arecont Vision website, www.arecontvision.com, dated Apr. 11, 2014.†

* cited by examiner
† cited by third party

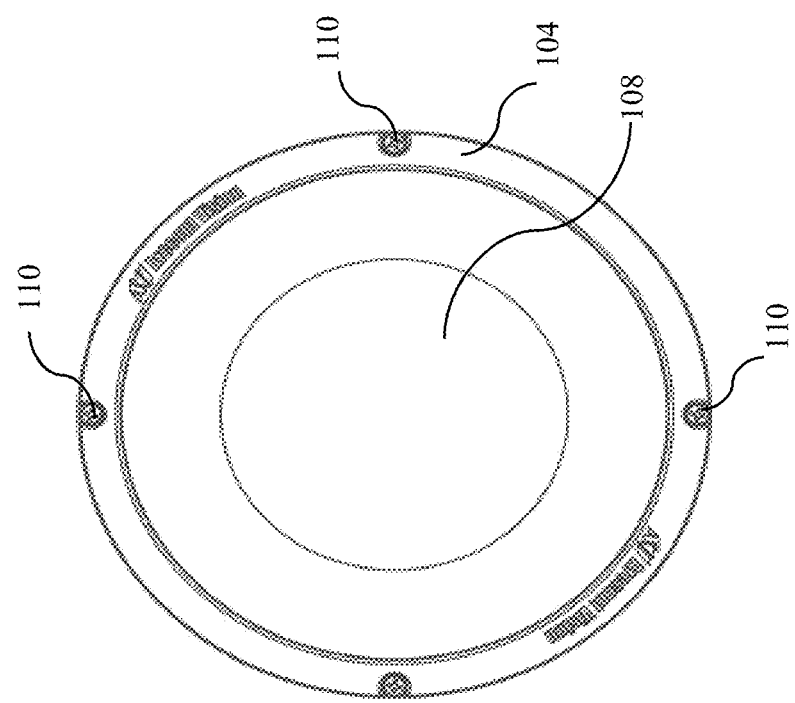
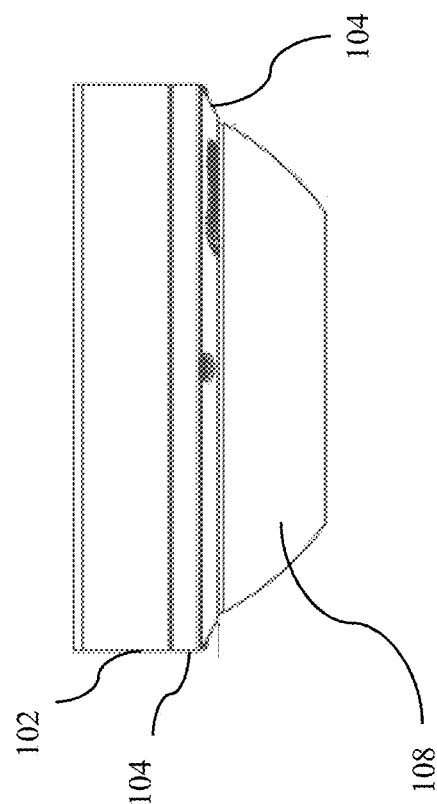
FIG. 1B
FIG. 1A

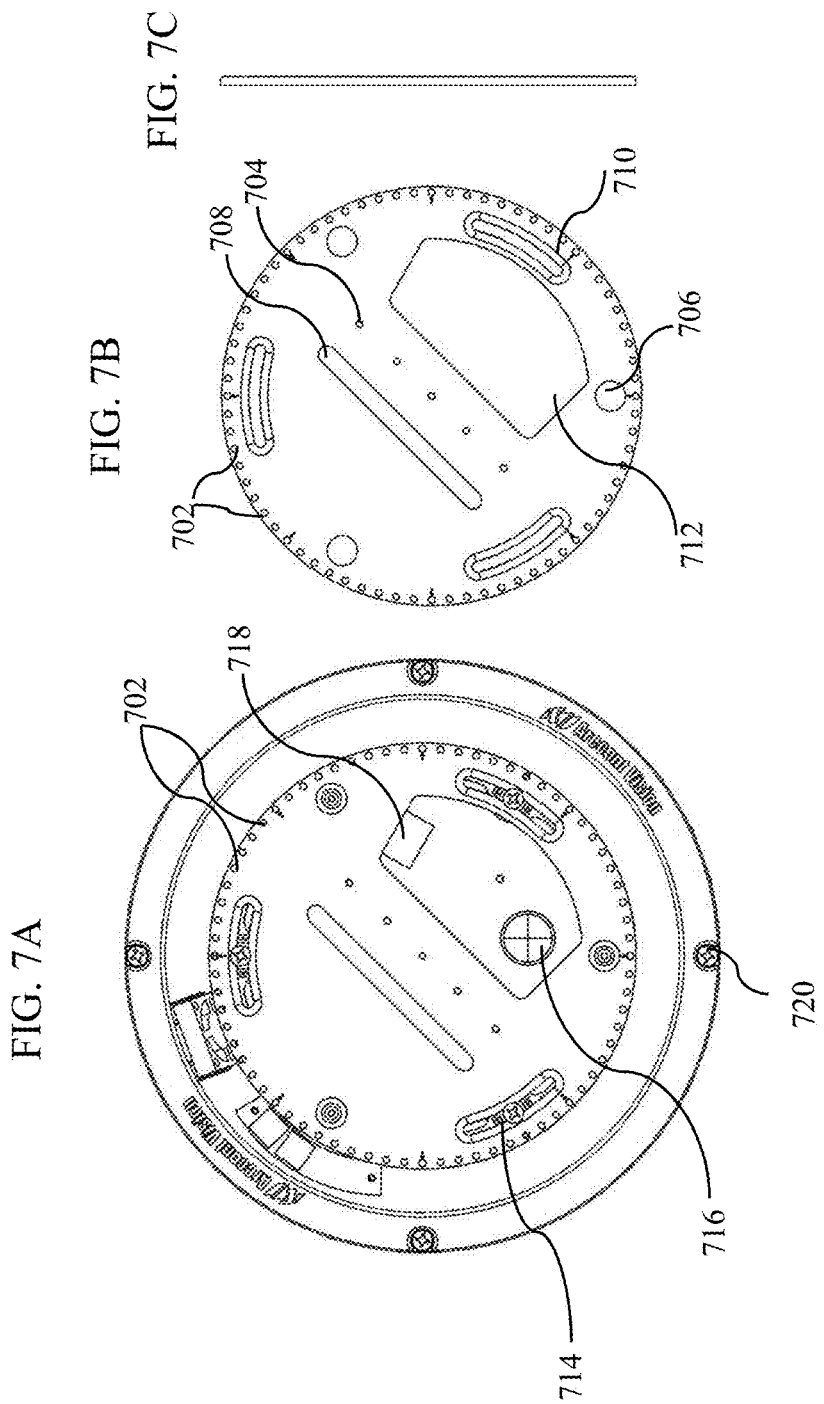

OMNIDIRECTIONAL USER CONFIGURABLE MULTI-CAMERA HOUSING

CROSS-REFERENCE TO RELATED APPLICATIONS

This Patent Application is a continuation application of U.S. patent application Ser. No. 14/682,974, filed Apr. 9, 2015, which claims the benefits of U.S. Provisional Patent Application Ser. No. 62/009,760, filed on Jun. 9, 2014 and entitled "Omnidirectional User Configurable Multi-Camera Housing," the entire content of which is hereby expressly incorporated by reference.

FIELD OF THE INVENTION

The present invention relates generally to a multi-camera housing and more specifically to an omnidirectional user configurable multi-camera housing.

BACKGROUND

Typical security or monitoring cameras contain a single image sensor inside of a camera housing or have multiple image sensors in a fixed location inside a housing. These configurations offer a fixed field of view (e.g., 180° or 360°). However, if a user needs to have multiple or very specific fields of views then more camera housing must be acquired, requiring multiple installation of housings that leads to more installation effort and cost, and potentially additional licensing fees for any software that the camera housings may require. The ability to use different lens options is another feature that makes the device more flexible. Typical multi-sensor cameras would have a fixed lens with no ability to use different lenses to get different fields of views.

SUMMARY

In some embodiments, the present invention is an omnidirectional user configurable multi-camera housing that includes a top plate including one or more electronic circuit boards thereon; a track plate secured to the top plate by a plurality of first fasteners, wherein the track plate is rotationally movable with respect to the top plate, when the first fasteners are loosen; a plurality of camera assemblies movably installed on the track plate and within the top plate. Each of the plurality of camera assemblies includes: a bracket movably secured to the track plate, a camera movably secured to the bracket, wherein the camera is rotatable in a plane perpendicular to the track plate, and a second fastener for movably securing the bracket to the track plate. The omnidirectional user configurable multi-camera housing further includes a transparent cover for covering the plurality of camera assemblies installed on the track plate; and a trim plate for securing the transparent cover to the top plate with a plurality of third fasteners. The track plate includes: a plurality of first index holes around a perimeter of the track plate for configurable indexing a positioning and an alignment of a first portion of the plurality of camera assemblies, a plurality of second index holes around a center of the track plate for configurable indexing a positioning and an alignment of a second portion of the plurality of camera assemblies, a plurality of curve-shaped openings to accommodate the plurality of first fasteners and allow movement of the plurality of first fasteners within the curve-shaped openings, respectively, for rotational movement of the track plate with respect to the top plate, when the plurality of first fasteners are loosen, and an opening for a cable coupled to the one or more electronic circuit boards.

In some embodiments, the present invention is an omnidirectional user configurable multi-camera housing that includes a top plate including one or more electronic circuit boards thereon; a track plate secured to the top plate by a plurality of first fasteners, wherein the track plate is rotationally movable with respect to the top plate via a respective curve-shaped opening that accommodates movement of a respective first fastener within the respective curve-shaped opening; a plurality of camera assemblies secured to the track plate by a plurality of magnetic devices, each of the camera assemblies including a camera and a bracket, movably installed on the track, wherein each of the camera is rotatable on a respective bracket in a plane perpendicular to the track plate, and wherein each of the bracket are rotatable in a plane including the track plate; and a transparent cover for covering the plurality of camera assemblies installed on the track plate.

BRIEF DESCRIPTION OF THE DRAWINGS

These and other features, aspects, and advantages of the present invention will become better understood with regard to the following description, appended claims, and accompanying drawings.

FIGS. 1A-1B depict an exemplary omnidirectional user configurable multi-camera housing, according to some embodiments of the present invention.

FIGS. 7A-7C depict an exemplary track plate without the camera assemblies, according to some embodiments of the present invention.

DETAILED DESCRIPTION

Figure 2A:
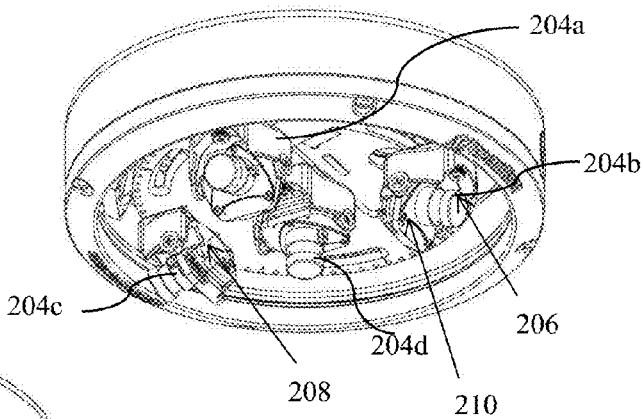
FIGS. 2A-2C show main components of an exemplary omnidirectional user configurable multi-camera housing, according to some embodiments of the present invention.

In some embodiments, the present invention is an omnidirectional user configurable multi-camera housing. The invention provides the user with capabilities of placing multiple cameras movably attached to an indexed track plate, which is then placed in a housing with a transparent cover ("bubble"), for example, a plastic or glass cover, which has a low profile.

In some embodiments, a multi-sensor multi-megapixel camera housing, according to the present invention, provides ample resolution to zoom-in for details in live and recorded video. In some embodiments, the present invention integrates several imagers, each with a choice of IR corrected lens, into an impact resistant dome-shaped housing. A unique track design allows several individual sensor gimbals to be independently placed in a variety of user-configurable configurations, such as, four cameras, each places at 90 degrees angle to each other, three or five cameras placed in an ad hoc user configuration, or six or more cameras in equally or ad hoc angle with respect to each other. In some embodiments, each camera includes data compression capabilities to reduce bandwidth and storage requirements, while delivering full frame rates and full resolution without sacrificing image quality. The present invention uniquely integrates and combines multiple cameras in a single housing with the ability to uniquely position each individual camera inside the housing to create desired field of views.

FIGS. 1A-1B depict an exemplary omnidirectional user configurable multi-camera housing, according to some embodiments of the present invention. FIG. 1A is a side view of the housing. As shown in the side view, a top plate 102, typically made of plastic or metal, houses one or more circuit board containing electronics and related connections for the multiple camera. The top plate 102 may also include a track plate, and the camera assemblies (not shown). A trim ring 104, which also may be made of plastic or metal, attaches to a cover and, in conjunction with a cover gasket, uses fasteners to create a weatherproof seal. A transparent cover 108, for example, a plastic dome-shaped cover is used to enclose the cameras within the housing with the top plate 102. In some embodiments, the cover 108 is truncated to be shaped as a half-sphere. The unique form/design of the bubble allows the multi-camera housing to be low-profile and have the optimal optical characteristics by positioning the plastic cover at an optimal distance from the lens. The truncated portion allows for optimal optical characteristics when camera assemblies are positioned directly above the truncated section. The track plate carries the camera assemblies and may be part of the top plate or a separate component attached to the top plate.

For example, if the cover were a complete half-sphere then, when the camera is placed in one of the center positions on the track plate, the distance from the image sensor or the lens to the bubble material would be too large which would cause image distortion. The truncated section creates a plane that is an optimal distance from the image sensor or lens. The rounded or spherical sides allow for an optimal distance from the image sensor or lens when the camera is places around the diameter of the track plate. The camera can be rotated or "tilted" 90 degrees and still maintain the optimal distance due to the shape of the spherical portion.

FIG. 1B is a top view of a omnidirectional user configurable multi-camera housing. As shown, fasteners 110 are used to secure the trim ring to the top plate and also secure the cover and the cover gasket. In some embodiments, the fasteners are security torx type fasteners (also called pin-in-torx), although other fasteners such as different types of screws, clips, brackets or the like may be used.

In some embodiments, the footprint of the housing is circular, as shown in the top view of FIG. 1B, although other footprints, such as elliptical square, rectangular or others are possible and within the scope of the present invention. The size of the housing is relatively small to be able to accommodate more versatile placement of the housing with the multiple cameras. In some embodiments, the height of the entire assembly is less than about 3.5 inches, while the length and width (e.g., the diameter of the circular footprint) is less than 8 inches.

Figure 2B:
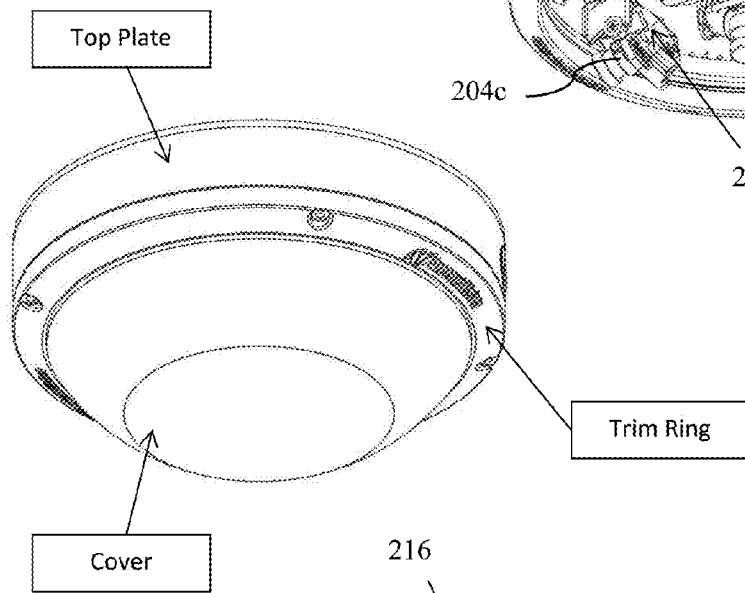
Figure 2C:
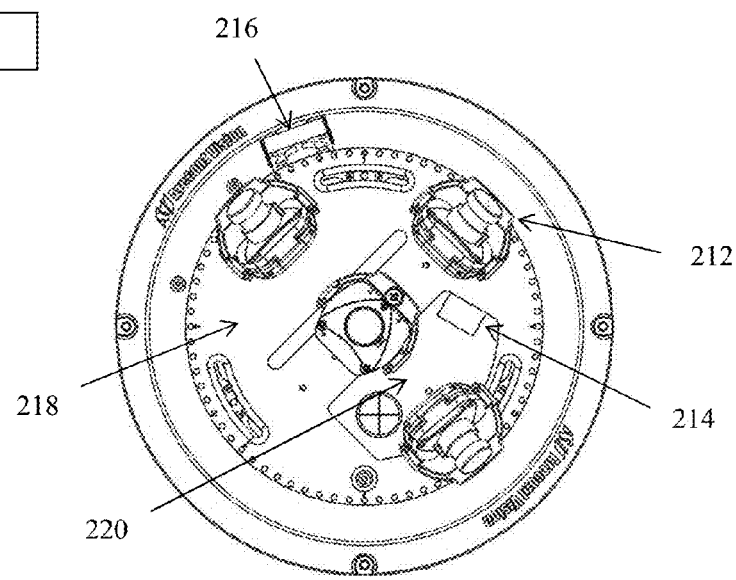
Figure 9:
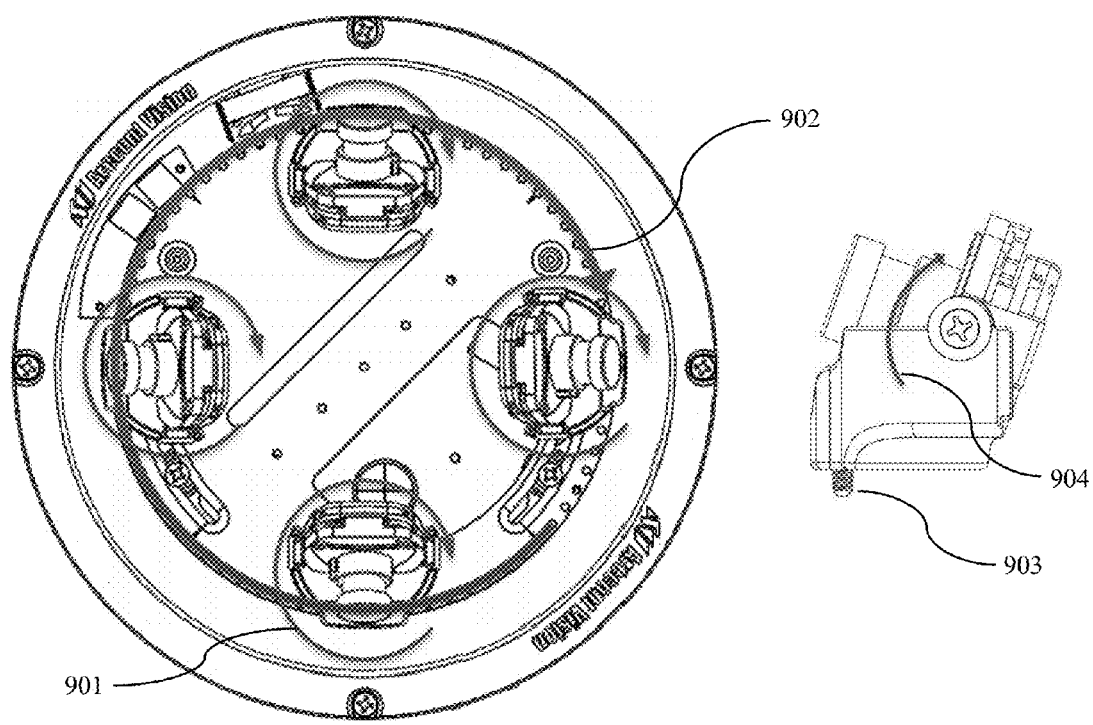
FIG. 9 illustrates an example of how camera assemblies are installed and adjusted on a track plate, according to some embodiments of the present invention.

FIGS. 2A-2C show main components of an exemplary omnidirectional user configurable multi-camera housing, according to some embodiments of the present invention. As shown in the example of FIG. 2A, four camera (lens) assemblies 204a, 204b, 204c and 204d are placed within the top plate 202 and installed on a track plate 218 (FIG. 2C). Camera assembly 204d is placed at the center of the track plate, while camera assemblies 204a, 204b and 204c are positioned around one half of the track plate, where camera assembly 204a is within about 60 degrees of each of the camera assemblies 204b and 204c. Although four cameras positioned at certain locations are depicted and described in FIGS. 2A-2C, the omnidirectional user configurable multi-camera housing of the present invention is not limited to four camera assemblies and any particular positioning of any of the camera assemblies. Some other examples of multiple camera assembly placement and configuration are shown in FIG. 9. These user selectable configurations of FIG. 9, may equally be applied to more or less than four camera assemblies.

As shown in FIGS. 2A and 2C, each camera assembly may include a camera sensor circuit board 208 that includes the electronics and connections for each camera, a lens 206, a plastic or metal lens bracket 212 to hold the parts together. Each camera assembly may also include a day/night switch 210 capable of moving a piece of infrared (IR) coated glass over the sensor (camera lens) to allow different light spectrums in for day mode or night mode. In some embodiments, the camera assemblies are secured to a track plate 218 using a fastening device, such as a screw, bracket, latch or the like, or some magnetic devices. In addition, the track plate 218 or the top plate supports one or more fans 216 for cooling the camera assemblies, one or more heating elements for heating the camera assemblies (not shown), one or more main circuit boards 220 that includes the electronics common to all of the camera assemblies, and one or more connectors 214 for input/output signals to/from the multi-camera housing. This configuration allows for adjustability to pan or tilt and to position each of the cameras individually, on the track plate. The trim ring secures the cover and the cover gasket to the top plate to make the housing a weatherproof assembly.

Figure 3A:
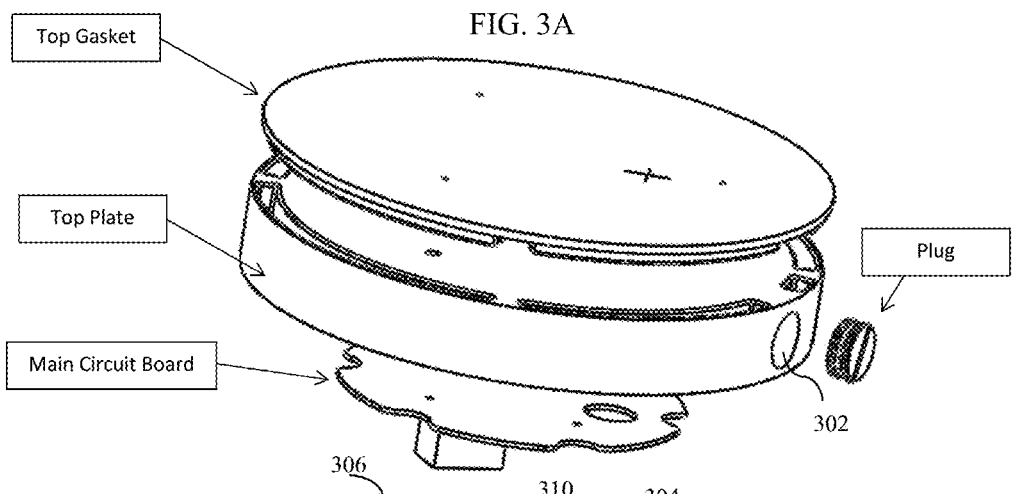
FIGS. 3A-3B show an exploded view of an exemplary omnidirectional user configurable multi-camera housing, according to some embodiments of the present invention.
Figure 3B:
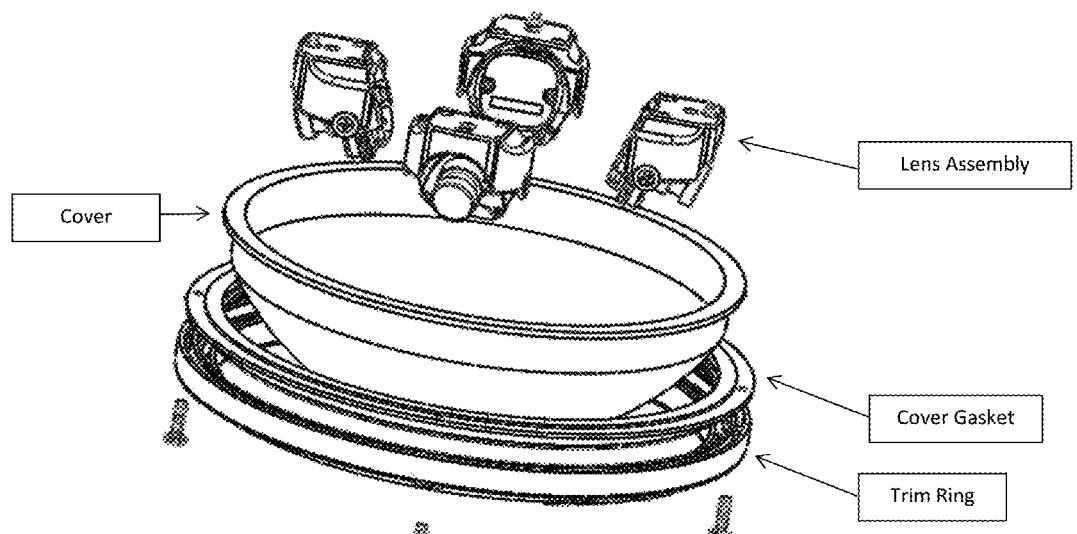

FIGS. 3A-3B show an exploded view of an exemplary omnidirectional user configurable multi-camera housing, according to some embodiments of the present invention. As shown in FIG. 3A, a top gasket (e.g., a rubber gasket) is used for creating a weatherproof seal between multi-camera housing (e.g., top plate) and mounting surface, for example a ceiling, wall or roof. In some embodiments, an NPT (national pipe thread) port 302 is used (for example, on the side of the top plate) to connect conduit and to allow cabling from the side of the camera (or the housing), rather than through the back of the camera (or the housing).

Each individual camera can be positioned in a variety of different locations on the track plate 318. The track plate includes a plurality of index holes 308 at its perimeter for indexing positions for specific camera assembly positioning and alignment. In some embodiments, the index holes 308 are 5 degrees apart and are aligned in such a way (in conjunction with the track plate diameter) to allow for positioning the camera to give 180, 270, and 360 degree fields of views. The index holes are optional to provide pre-defined positions and indexing locations. One or more magnets (magnetic devices) may be used in alternative or in addition to the index holes (not shown). A plurality of larger holes 306 are positioned close to the perimeter of the track plate for mounting the camera. These hole 306 allow mounting screws (or fasteners) to pass through the track plate and reach the mount holes in the top plate and the opening (slit) 310 positioned close to the center of the track plate. The slit 310 allows the wires connecting the camera sensor board to the main board to pass through the track plate.

Figure 4:
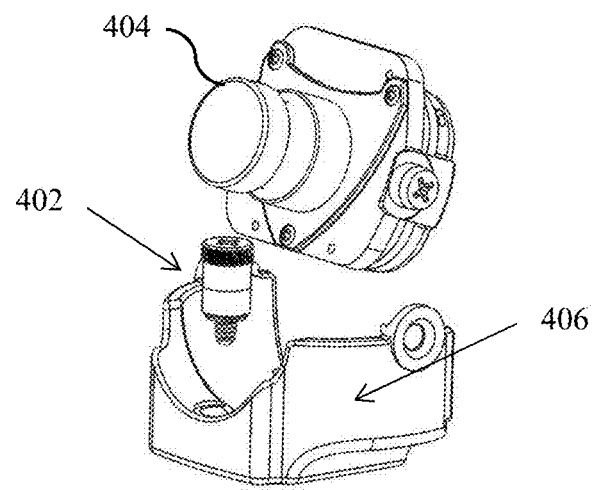
FIG. 4 depicts an exemplary camera bracket assembly, according to some embodiments of the present invention.

The track plate also includes a plurality of smaller holes 312 close to its center and arrange in a straight line also used to install the camera assemblies in the center position(s), as shown in FIG. 4. The holes 312 are similar in function to index holes 308. A plurality of fasteners 304 secure the track plate to the top plate. The curved (for example, oblique-shaped) openings/slots 304a around the fasteners 304 are thru hole slots that allow the user to adjust (rotate) the track plate when the fasteners 304 are loosened, giving the user flexibility to rotate the track plate (with respect to the top plate) independently of the top plate after the top plate has been affixed to its mounting surface. This way, individual camera assemblies are secured using a fastening device or magnetic device. In some embodiments, magnets are attached to the brackets (204a in FIG. 2A) that affix to the track plate allowing the user to affix a camera assembly to the track plate, without the constraints of the indexing holes. Camera assemblies when secured are allowed to move or rotate to accommodate adjustments to field of view.

As show in FIG. 3B, a cover gasket, for example, a rubber gasket, is used for creating a weatherproof seal between the top plate and the cover. A trim ring is used to secure the cover and the cover gasket to the top plate. The cover is used to protect and/or hide the inside of the camera housing. In some embodiments, the cover is made of clear plastic, which can be tinted or mirrored finish. Each lens assembly includes a lens, a day/night switcher, a sensor circuit board, and a bracket system that holds the parts together and mounts the assembly to the track plate using a fastening device or magnets. The bracket system allows the camera to tilt and pan while attached to the track plate.

FIG. 4 depicts an exemplary camera bracket assembly, according to some embodiments of the present invention. Each individual camera 404 can be positioned in a variety of different locations on the track plate via the bracket assembly. A fastener 402, such as a permanently attached captive panel screw, is attached to the camera bracket 406 and used to hold the fastener in place while the bracket is being attached to the track plate. A captive fastener make installation easier as in many instances where gravity is working against the installer to prevent the fastener (e.g., screw) from falling. As shown, the camera is movably secured to the bracket so that the camera can rotate in a plane perpendicular to the track plate, on which the bracket is movable installed. Also, as shown in FIG. 9 (arrow 901), the camera bracket can be rotated on the track plate using the indexing hole or the magnets.

Figure 5:
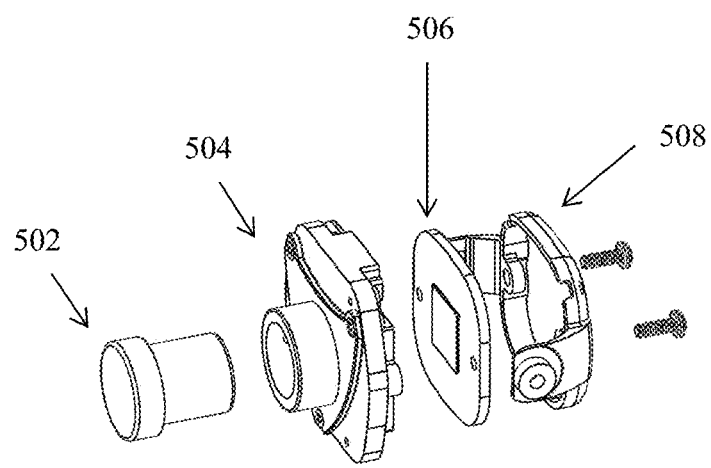
FIG. 5 illustrates an exploded view of an exemplary camera bracket assembly, according to some embodiments of the present invention.

FIG. 5 illustrates an exploded view of an exemplary camera bracket assembly, according to some embodiments of the present invention. As shown, the camera bracket assembly includes a lens 502, a day/night switch 504, the circuit board 506 and a bracket 508. The components in the exploded view interact with the bracket (base bracket with the fastener and magnets). These components mount to the base bracket in such a way to allow for the camera assembly to tilt or rotate around the axis where the two bracket parts opposing each other mate.

FIGS. 6A-6F shows several examples of the placement configuration of the camera assemblies in the housing, according to some embodiments of the present invention. In some embodiments, the lens bracket assembly which houses the camera assembly has the ability to move around the track plate, for example, in an elliptical or circular pattern in, for example, 5° increments plus additional locations around the center of the camera; tilt, for example, up to 90° or more; and rotate around the captive fastener position. Each of these movements is depicted in FIG. 9. In some embodiments, the lens bracket also has magnets attached to the bottom surface of the lens bracket which provides more camera positioning options at the expense of a secure attachment using the (captive) fastener.

Figure 6A:
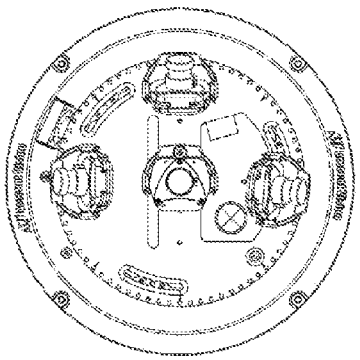
FIGS. 6A-6F show several examples of the placement configuration of the camera assemblies in the housing, according to some embodiments of the present invention.
Figure 6B:
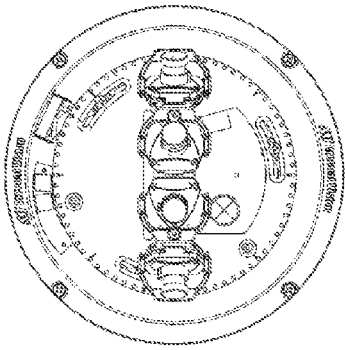
Figure 6C:
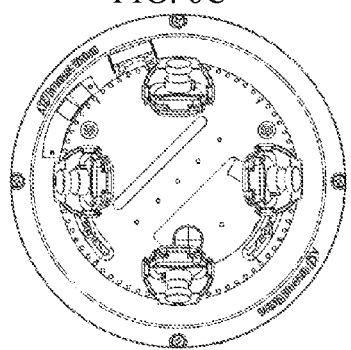
Figure 6D:
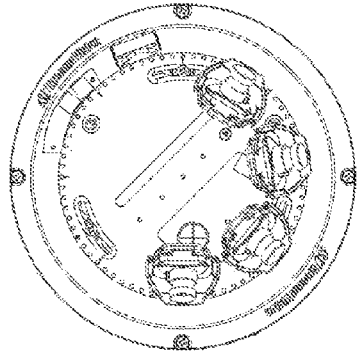
Figure 6E:
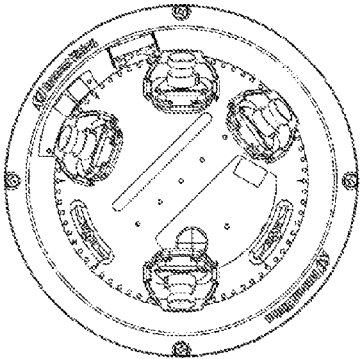
Figure 6F:
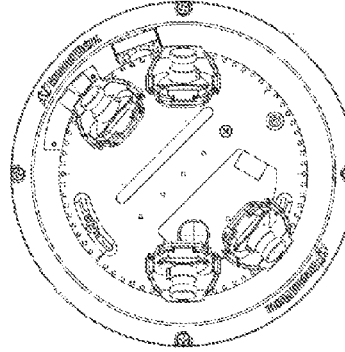

As shown, the camera assemblies may be positioned on the track plate in a variety of user-selectable positions, for example, in a 270° viewing angle (FIG. 6A). Each of the 3 lenses has a horizontal field of view of 90 degrees in a straight nine (FIG. 6B); 360° or hallway (FIG. 6C); 180° or panoramic (FIG. 6D); randomly (user configured) (FIG. 6E and FIG. 6F). Although four camera assemblies are shown in FIGS. 6A-6F, as readily understood by one skilled in the art, the present invention is not limited to four camera assemblies, rather, any number of camera assemblies can be used, as long as they fit within the housing.

FIGS. 7A-7C depict an exemplary track plate without the camera assemblies, according to some embodiments of the present invention. The unique design of the track plate allows each individual camera assembly to be positioned in a desired location on the track plate to achieve a desired field of view. As shown, the track plate has a plurality of indexing features 702 and 704 (holes) to secure the camera assemblies for a customizable camera configurations and allow for camera assemblies to be secured using magnetics for more flexibility. The indexing features 702 are formed around the perimeter of the track plate. In this example there are about 72 indexing features 702 that are placed apart from the previous feature by about 5 degrees, however, other numbers of the indexing feature are possible and within the scope of the present invention. Additionally the track plate includes an additional plurality of indexing features 704 that are placed diagonally going through the center of the track plate. These second batch of the indexing features 704 are used to position one or more camera assemblies in the middle or center of the track plate.

Openings (holes) 706 are used to mount the camera to a ceiling or mounting bracket. A slit-shaped opening 708 in the middle of the track plate allows for cables to pass thru the track plate from the main circuit board to the sensor circuit boards. Several curved (for example, oblique-shaped) openings 710 are arranged around the perimeter of the track plate and inward of the indexing features 702. These oblique-shaped openings 710 are used for mounting the track plate to the top plate and allow for rotational adjustment of the track plate relative to the top plate. A larger opening 712 is configured, shaped and placed within the track plate to accommodate access to the network port, auxiliary power connectors and to allow cables to pass thru the track plate from the main circuit board to the sensor circuit boards. In some embodiments, the circuit board is secured to the top plate using fasteners.

The slots 714 mount the track plate to the top plate and allow for rotational adjustment of the track plate relative to the top plate, when the fasteners (e.g., screws) are loose. Once positioned, the fasteners are tightened down and the track plate is secured. This feature is useful when the top plate is securely installed and the installer needs to adjust the track plate position. One or more access ports 716 are used for running cable through the top plate and provide access to the cameras and Ethernet jack 718, which is used to communicate with the cameras. The access port is typically covered by a gasket. In some embodiments, it is covered by the top gasket. The access port is positioned in a location that allows for the cable to have sufficient bend radius (i.e. not directly under the track plate). The Ethernet jack 718 allows the camera assemblies to connect to a network and allows for power over Ethernet to power the cameras. Screws 720 attach the trim ring to the top plate. When assembled, the screws 720 capture and hold the bubble and bubble gasket in place by sandwiching them between the trim ring and top plate.

The side view of the track plate is shown in FIG. 7C. As shown, in these embodiments, the track plate is a relatively thin planar plate that is made of sturdy material such as metal, or hard plastic.

Figure 8:
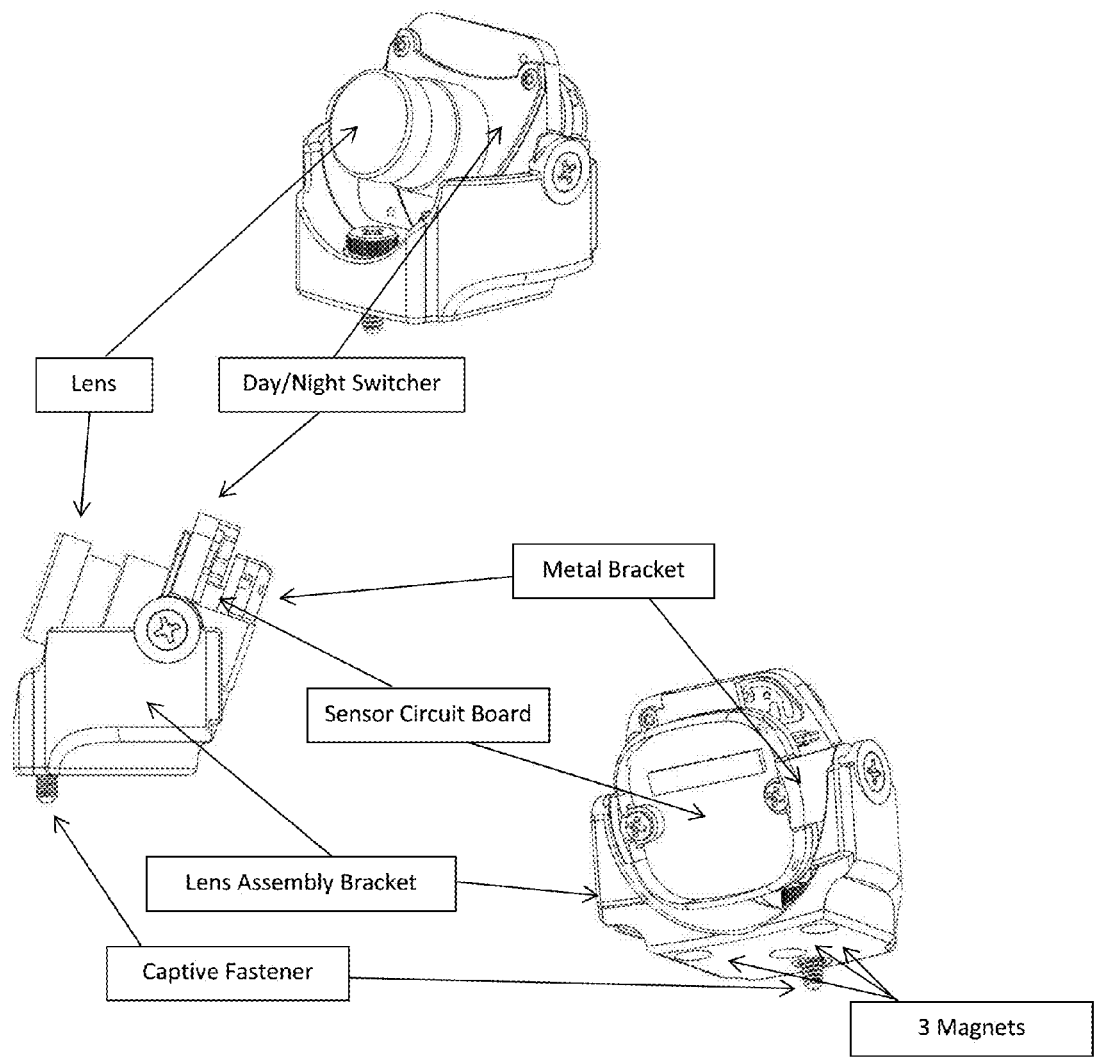
FIG. 8 shows an exemplary detail view of a camera (lens) assembly, according to some embodiments of the present invention.

FIG. 8 shows an exemplary detail view of a camera (lens) assembly, according to some embodiments of the present invention. In some embodiments, the day/night switch is an electro-mechanical device that slides an IR coated glass in front of the sensor for daytime and nighttime operation. The metal bracket holds the day/night switch and sensor circuit board together. It also attaches to the lens assembly bracket and allows day/night switcher and sensor circuit board to rotate. The sensor circuit board is a printed circuit board with megapixel CMOS image sensor. The lens assembly bracket is a plastic or metal bracket used to hold the lens, day/night switcher/sensor circuit board combination and to secure the entire assembly to the track plate. It also holds the captive fastener and magnets.

The captive fastener attaches the lens assembly bracket to the track plate. The screw may be a captive screw so as that it won't fall down during camera setup. Magnets may be attached to the lens assembly bracket that provide a secondary and more flexible way to mount the lens assembly bracket.

FIG. 9 illustrates an example of how camera assemblies are installed and adjusted on a track plate, according to some embodiments of the present invention. As shown, camera assemblies have the ability to tilt the image, rotate on the camera assembly, and rotate on the track plate. The arrow 901 illustrates how the camera assembly is able to rotate around the axis created by the captive fastener 903. In this example, the rotation can be accomplished when the camera is affixed to the track plate in any position using the captive fastener. Further positioning of the camera assembly can be accomplished by using magnets to secure the camera assemblies, instead of the fasteners. The arrow 902 illustrates how each individual camera assembly can be mounted in any position around the track plate using the pre-defined positioning holes. using the (captive) fastener 903 or magnets. The arrow 904 illustrates how the camera assembly can tilt or rotate on the axis through the camera bracket.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims and drawings.

What is claimed is:

1. An omnidirectional user configurable multi-camera housing comprising:
   a top plate;
   a track plate secured to the top plate by a plurality of first fasteners, wherein the track plate is movable with respect to the top plate;
   a plurality of camera assemblies movably installed on the track plate and within the top plate, each comprising:
      a bracket movably secured to the track plate, and
      a camera movably secured to the bracket;
   a transparent cover for covering the plurality of camera assemblies installed on the track plate; and
   a trim plate for securing the transparent cover to the top plate with a plurality of third fasteners, wherein the track plate includes:
      a plurality of first index openings around a perimeter of the track plate for configurably indexing a positioning and an alignment of a first portion of the plurality of camera assemblies,
      a plurality of second index openings for configurably indexing a positioning and an alignment of a second portion of the plurality of camera assemblies,
      a plurality of openings to accommodate the plurality of first fasteners and allow movement of the plurality of first fasteners within the openings, respectively, for movement of the track plate with respect to the top plate, and
      an opening for a wire.

2. The omnidirectional user configurable multi-camera housing of claim 1, further comprising a top gasket attached to the top plate for a weatherproof seal between the top plate and a mounting surface for the housing.

3. The omnidirectional user configurable multi-camera housing of claim 1, further comprising a cover gasket attached to the top plate for a weatherproof seal between the top plate and the cover.

4. The omnidirectional user configurable multi-camera housing of claim 1, wherein the plurality of second index openings are positioned around a center of the track plate.

5. The omnidirectional user configurable multi-camera housing of claim 1, wherein one or more of the plurality of camera assemblies include a day/night switch for moving a piece of infrared (IR) coated glass over a camera lens to allow different light spectrums in for a day mode or a night mode.

6. The omnidirectional user configurable multi-camera housing of claim 1, further comprising one or more fans for cooling the plurality of camera assemblies.

7. The omnidirectional user configurable multi-camera housing of claim 1, wherein the camera is rotatable in a plane perpendicular to the track plate.

8. The omnidirectional user configurable multi-camera housing of claim 1, further comprises a second fastener for movably securing the bracket to the track plate.

9. The omnidirectional user configurable multi-camera housing of claim 1, wherein a footprint of the housing is circular or elliptical.

* * * * *